LA VERNE W. NOYES.
WINDMILL.
APPLICATION FILED NOV. 17, 1911.
1,022,205.
Patented Apr. 2, 1912.
2 SHEETS—SHEET 2.
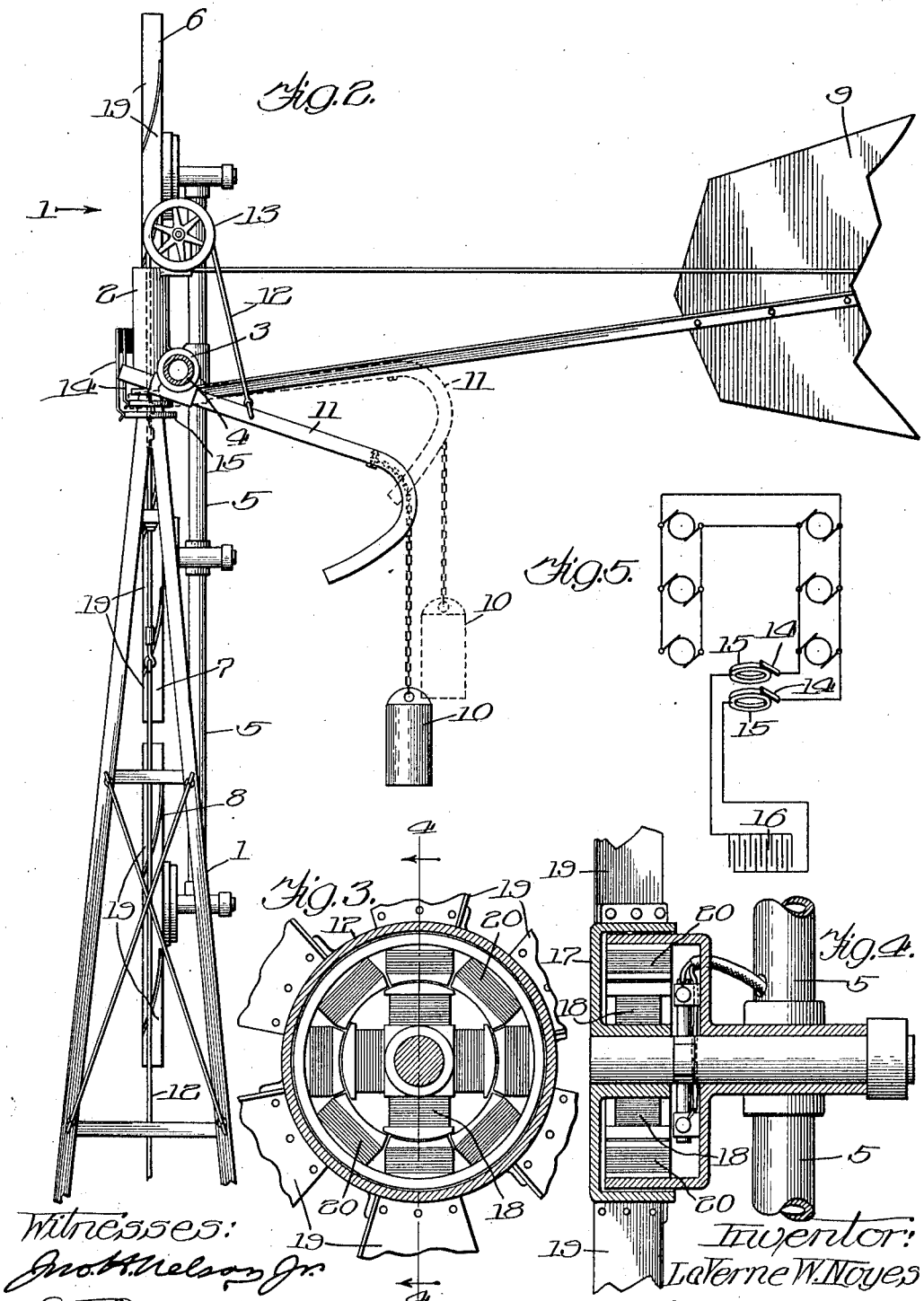

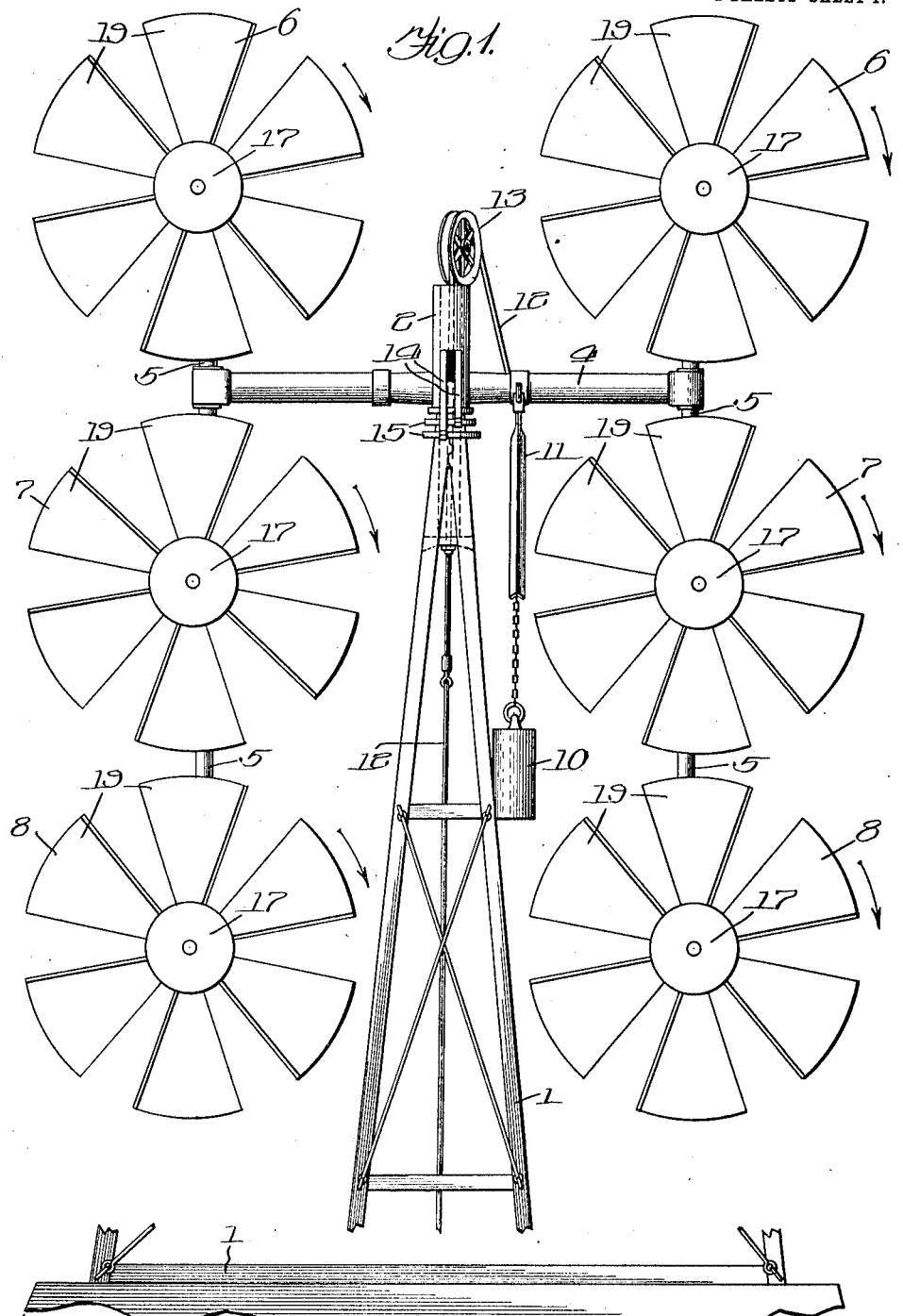

UNITED STATES PATENT OFFICE.

LA VERNE W. NOYES, OF CHICAGO, ILLINOIS.

WINDMILL.

1,022,205.  Specification of Letters Patent.  Patented Apr. 2, 1912.

Application filed November 17, 1911. Serial No. 660,836.

*To all whom it may concern:*

Be it known that I, LA VERNE W. NOYES, citizen of the United States, residing at Chicago, in the county of Cook and State of Illinois, have invented a certain new and useful Improvement in Windmills, of which the following is a full, clear, concise, and exact description, reference being had to the accompanying drawings, forming a part of this specification.

My invention relates to wind mills and has a number of objects and advantages in view.

Some of the features of my invention relate to that class of wind mill structures in which the load driving wind wheels are mounted bodily to swing perpendicularly, or transversely with respect to the horizontal, and while I have embodied the remaining features of my invention in a wind mill of this type I do not wish to limit myself to a structure of the class specified that includes all of my improvements.

It has hitherto been proposed to mount wind wheels so that they would swing about horizontal axes located below the individual axes of rotation of the wind wheels, balancing weights having been employed to hold the wheels to the wind and to oppose the bodily swinging movements of the wheels to regulate the effective areas of the wheels to be in suitable relation to the force of the wind. In such structures of the prior art the balancing weights were increased to counterbalance or compensate for the weight of the wind wheels.

It is one object of my invention to provide a construction in which the mere weight of the wind wheels need not be compensated for and I accomplish this result by locating the individual axis or axes of the wind wheels of a wind mill structure below the axis about which the wind wheels may be bodily swung transversely with respect to the horizontal. By this arrangement not only is the presence of the counterbalancing portions of the balancing weights of the prior art dispensed with but the weight of the wheels also serves to perform the function or a part of the function of the balancing weights so that the additional weight that may be employed to supplement the weight of the wheels for the purpose of properly holding the wheels may be reduced to a minimum, while at the same time the wind mill structure may be greatly simplified.

In the preferred embodiment of my invention I employ a plurality of load driving wind wheels in a given wind mill structure, these wind wheels being mounted to be rotated about axes individual thereto and to be together bodily swung by the wind (assuming the wind to have sufficient force) transversely with respect to the horizontal about an axis intervening between the individual axes of said wind wheels and located closer to the upper individual wind wheel axis than the lower, the sails of the wind wheels being of such relative effective area that the action of the wind will preponderate upon the lower sails and cause the wind wheels to be bodily swung in opposition to the swinging force exerted by the wind upon the upper sails. I preferably provide additional sails substantially to offset the tendency of the upper sails to swing the wind wheels bodily.

To allow the wind wheels automatically to be positioned squarely to face the wind in its changing directions, I provide a mounting that affords an additional axis of movement for the wind wheels and which is transverse to the horizontal and also transverse to the axes of the rotation of the wind wheels, the wind wheels having effective sail areas that are substantially evenly distributed upon opposite sides of the additional axis whereby the wind will exert substantially equal and opposite turning efforts upon such evenly distributed sail areas for the purpose of holding the wind wheels directly against the wind. This action of the wind in holding the wind wheels directly against the wind may be supplemented by a directing vane.

The wind mill structure may also include manually controlled means whereby the wind wheels thereof may be substantially horizontally positioned to remove them from the wind and which may readily be manipulated to permit the wheels to be restored to working condition.

There are other features of my invention which will later be disclosed, and my invention in all of its characteristics will be fully described by reference to the accompanying drawings showing the preferred embodiment thereof and in which—

Figure 1 is a view in the direction of arrow 1 of Fig. 2; Fig. 2 is a side view of the structure shown in Fig. 1, portions of the tower framework being broken away in Figs. 1 and 2; Fig. 3 is a sectional view taken through the casing of a generator; Fig. 4 is a sectional view on line 4 4 of Fig. 3; and Fig. 5 is a circuit diagram illustrating a system of wiring when the wheels of a multipled wheel wind mill structure are employed for operating direct current generators for the purpose of charging a storage battery.

Like parts are indicated by similar characters of reference throughout the different figures.

The wind mill tower 1 supports a sleeve 2 at its upper end, this sleeve being journaled to rotate about its axis which is vertical. The sleeve carries a bearing 3 located back of the tower top, this bearing holding a tubular shaft 4 and defining a horizontal axis of rotation that is located to the rear of the vertical axis of rotation of the sleeve 2. The tubular shaft carries supports 5 upon its outer ends and which are rigid with respect to the shaft 4, these supports 5 in turn carrying the load driving sails that are preferably distributed in groups to constitute wind wheels 6, 7 and 8. Each wind wheel has an individual axis of rotation that is preferably fixed with respect to the axis of the shaft 4. The load driving wind wheels are so distributed about the vertical axis afforded by the sleeve 2 that the effective area of the sails is substantially equally distributed upon both sides of such vertical axis whereby the wind wheels may be held to the wind, a result that may be further assured by the provision of a directing vane 9 fixed upon and with respect to the sleeve 2. The drawings show two wind wheels 6 above the horizontal shaft 4 and four wind wheels 7, 8 below said shaft, the wind wheels 6 being located above the shaft a distance similar to that of the wheels 7 below the shaft and inasmuch as these wheels are similar in construction and size the effort of the wind upon the upper wheels 6 to rotate them about the axis of the shaft 4 is counteracted by the action of the wind upon the lower wheels 7. The wind wheels 8 are, in effect, unopposed and unassisted in their swinging movements about the axis of the shaft 4 by the wheels 6 and 7 and while I prefer to employ the additional wheels 6 and 7 I do not wish to be limited to the presence thereof as an important feature of my invention resides in the location of a wind wheel or wheels 8 below the shaft 4 so that the weight of such wheels may be of service in restoring the same toward the vertical and in opposing that action of the wind that would tend bodily to swing them transversely with respect to the horizontal about the axis afforded by the shaft 4, there being disclosed a load driving wind wheel mounted to be rotated by the wind about its axis and to be bodily swung by the wind transversely with respect to the horizontal about an axis which is normally located above the axis of the wheel. The weight of the wind wheels is supplemented by a balancing-weight 10 to assist their return toward the vertical when the force of the wind decreases and properly to oppose the bodily swinging movement of the wind wheels toward the horizontal when the force of the wind increases.

I preferably provide means for automatically adjusting the effect of the weight or other auxiliary device employed for its purpose. In the embodiment of the invention illustrated I adjust the action of the weight by causing the lever 11 by which it is carried and through which it operates to increase its effective length throughout an initial portion of the bodily swinging movement of the wind wheels effected by the wind transversely with respect to the horizontal. This increase in the length of the lever is effected by curling the lever end as illustrated in Fig. 1 and anchoring the chain by which the weight is carried between the ends of the lever, the chain being received within the grooved end of the lever so that the place of engagement of the chain with the lever may be altered as the lever is swung, it being understood that the lever is in fixed relation with respect to the shaft 4, as illustrated most clearly in Fig. 1. The chain or cable 12 is passed over a sheave 13 and is connected at its upper end with the lever 11 whereby said lever may be elevated in order to turn the shaft 4 for the purpose of bodily swinging the wind wheels 6, 7 and 8 toward the horizontal to remove them from the driving influence of the wind.

The wind mill of my invention, as specifically embodied, is of particular service for the generation of electric current and may be employed for charging storage batteries, in which event each wind wheel is directly coupled with the rotor or armature of a generator and the generators are connected in parallel between the sides of a charging circuit extending to a storage battery. Owing to the rotatable mounting 2 for the wind wheels the conductors connecting the generator brushes terminate in brushes 14 which are mounted upon and move with the sleeve 2 and which engage collector rings 15 stationarily mounted upon the top portion of the tower 1 and which constitute terminal connections for the storage battery 16. The hub 17 of each wind wheel is provided with a recess surrounding its axis of rotation, the inner wall of the hub recess carrying the armature 18 of the associate generator while the outer wall of said recess carries the sails 19 of the wind wheel. The field portion 20 of the generator is also received within the hub recess and is fixed with respect to the wheel supporting arms 5, as illustrated in Fig. 4.

The combined wind wheel and generator which has been described and which is shown particularly in Figs. 3 and 4, is of service whether the wind mill structure is provided with multipled wind wheels or not.

While I have herein shown and particularly described the preferred embodiment of my invention I do not wish to be limited to the precise details of construction shown as changes may readily be made without departing from the spirit of my invention, but

Having thus described my invention, I claim as new and desire to secure by Letters Patent the following:—

1. A wind mill including a load driving wind wheel mounted to be rotated by the wind about its axis and to be bodily swung by the wind transversely with respect to the horizontal about an axis which is normally located above the axis of the wheel whereby the weight of said wheel opposes bodily swinging movement of the wheel which is occasioned by the wind.

2. A wind mill including a plurality of load driving wind wheels mounted to be rotated about axes individual thereto and to be bodily swung by the wind transversely with respect to the horizontal about an axis intervening between the individual axes of the wind wheels and located closer to the upper of the individual wind wheel axes, the sails of the wind wheels being of such relative effective area that the action of the wind will preponderate upon the lower sails and cause the wind wheels to be bodily swung in opposition to the swinging force exerted by the wind upon the upper sails.

3. A wind mill including a plurality of load driving wind wheels mounted to be rotated about axes individual thereto and to be bodily swung by the wind transversely with respect to the horizontal about an axis intervening between the individual axes of the wind wheels, the sails of the wind wheels being of such relative effective area that the action of the wind will preponderate upon the lower sails and cause the wind wheels to be bodily swung in opposition to the swinging force exerted by the wind upon the upper sails.

4. A wind mill including a plurality of load driving wind wheels mounted to be rotated about axes individual thereto and to be bodily swung by the wind transversely with respect to the horizontal about an axis intervening between the individual axes of the wind wheels and located closer to the upper of the individual wind wheel axes, the sails of the wind wheels being of such relative effective area that the action of the wind will preponderate upon the lower sails and cause the wind wheels to be bodily swung in opposition to the swinging force exerted by the wind upon the upper sails; and a mounting affording an additional axis of movement for the wind wheels and which is transverse to the horizontal and to the axes of rotation of the wind wheels, said wind wheels having effective sail areas substantially evenly distributed upon opposite sides of said additional axis whereby the wind wheels may be bodily rotated as a group and held to the wind.

5. A wind mill including a plurality of load driving wind wheels mounted to be rotated about axes individual thereto and to be bodily swung by the wind transversely with respect to the horizontal about an axis intervening between the individual axes of the wind wheels, the sails of the wind wheels being of such relative effective area that the action of the wind will preponderate upon the lower sails and cause the wind wheels to be bodily swung in opposition to the swinging force exerted by the wind upon the upper sails; and a mounting affording an additional axis of movement for the wind wheels and which is transverse to the horizontal and to the axes of rotation of the wind wheels, said wind wheels having effective sail areas substantially evenly distributed upon opposite sides of said additional axis whereby the wind wheels may be bodily rotated as a group and held to the wind.

6. A wind mill including a plurality of load driving wind wheels mounted to be rotated about axes individual thereto and to be bodily swung by the wind transversely with respect to the horizontal about an axis intervening between the individual axes of the wind wheels and located closer to the upper of the individual wind wheel axes, the sails of the wind wheels being of such relative effective area that the action of the wind will preponderate upon the lower sails and cause the wind wheels to be bodily swung in opposition to the swinging force exerted by the wind upon the upper sails; and additional sails located substantially to offset the tendency of the upper sails to swing the wind wheels bodily transversely with respect to the horizontal.

7. A wind mill including a plurality of load driving wind wheels mounted to be rotated about axes individual thereto and to be bodily swung by the wind transversely with respect to the horizontal about an axis intervening between the individual axes of the wind wheels, the sails of the wind wheels being of such relative effective area that the action of the wind will preponderate upon the lower sails and cause the wind wheels to be bodily swung in opposition to the swinging force exerted by the wind upon the upper sails; and additional sails located substantially to offset the tendency of the upper sails to swing the wind wheels bodily transversely with respect to the horizontal.

8. A wind mill including a plurality of load driving wind wheels mounted to be rotated about axes individual thereto and to be bodily swung by the wind transversely with respect to the horizontal about an axis intervening between the individual axes of the wind wheels and located closer to the upper of the individual wind wheel axes, the sails of the wind wheels being of such relative effective area that the action of the wind will preponderate upon the lower sails and cause the wind wheels to be bodily swung in opposition to the swinging force exerted by the wind upon the upper sails; a mounting affording an additional axis of movement for the wind wheels and which is transverse to the horizontal and to the axes of rotation of the wind wheels, said wind wheels having effective sail areas substantially evenly distributed upon opposite sides of said additional axis whereby the wind wheels may be bodily rotated as a group and held to the wind; and additional sails located substantially to offset the tendency of the upper sails to swing the wind wheels bodily transversely with respect to the horizontal.

9. A wind mill including a plurality of load driving wind wheels mounted to be rotated about axes individual thereto and to be bodily swung by the wind transversely with respect to the horizontal about an axis intervening between the individual axes of the wind wheels, the sails of the wind wheels being of such relative effective area that the action of the wind will preponderate upon the lower sails and cause the wind wheels to be bodily swung in opposition to the swinging force exerted by the wind upon the upper sails; a mounting affording an additional axis of movement for the wind wheels and which is transverse to the horizontal and to the axes of rotation of the wind wheels, said wind wheels having effective sail areas substantially evenly distributed upon opposite sides of said additional axis whereby the wind wheels may be bodily rotated as a group and held to the wind; and additional sails located substantially to offset the tendency of the upper sails to swing the wind wheels bodily transversely with respect to the horizontal.

In witness whereof, I hereunto subscribe my name this ninth day of November A. D., 1911.

LA VERNE W. NOYES.

Witnesses:
DANIEL R. SCHOLES,
L. C. WALKER.

---

Copies of this patent may be obtained for five cents each, by addressing the "Commissioner of Patents. Washington, D. C."